April 25, 1967 B. H. HUMPHERYS 3,316,424

PULSE WIDTH SHAPER

Filed July 20, 1964

INVENTOR.
BERNARR H. HUMPHERYS

BY

ATTORNEYS 3,316,424
PULSE WIDTH SHAPER
Bernarr H. Humpherys, 719 N. Goldenrod Ave., Escondido, Calif. 92025
Filed July 20, 1964, Ser. No. 384,009
6 Claims. (Cl. 307—88.5)

The invention described herein may be manufactured and used by or for the Government of the United States of America for governmental purposes without the payment of any royalties thereon or therefor.

The present invention relates to a pulse width shaper and more particularly, to a means for producing narrow, sharp pulses and specifically, to a pulse width shaper for producing sharp narrow pulses independent of the pulse width of an input waveform.

Many times in electronic circuitry, especially where pulses are involved, trouble arises due to the fact that the pulses desired are misshapen, i.e., they have the wrong width and leading and/or trailing edges which are not sharply defined. Ordinarily, equipments are designed to utilize a pulse having a definite width and an extremely sharp leading and trailing edge so that the circuit is turned on and off almost instantaneously.

Many attempts have been made to solve the problem, however none have proved satisfactory due to various disadvantages. One method tried utilized differentiation, however this was unsatisfactory due to the spike produced which has a wide base and narrow apex. Another circuit involved is referred to as a "tail biter" which utilizes a delay line with the output of the delay line being coupled back to an inhibit circuit. The output of the inhibit circuit is coupled to the input of the delay line for controlling the pulse width. The "tail biter" circuit is unsatisfactory because the delay line is tied up while a wide pulse is inhibited and while the delay line recovers. Another technique utilizes coincidizing the input and output of the delay line. The disadvantage in this technique is that a short pulse, i.e., shorter than the delay line, is lost.

An object of the present invention is to provide an improved pulse shaper.

A further object of the invention is to provide a pulse shaper for producing sharp narrow pulses.

An additional object of the invention is to provide a pulse shaper for providing a sharp narrow pulse independent of the pulse width of an input waveform.

A further object of the invention is to provide a pulse shaper utilizing conventional uncomplicated circuitry which is easy to maintain and adjust in operation.

Figure 1:
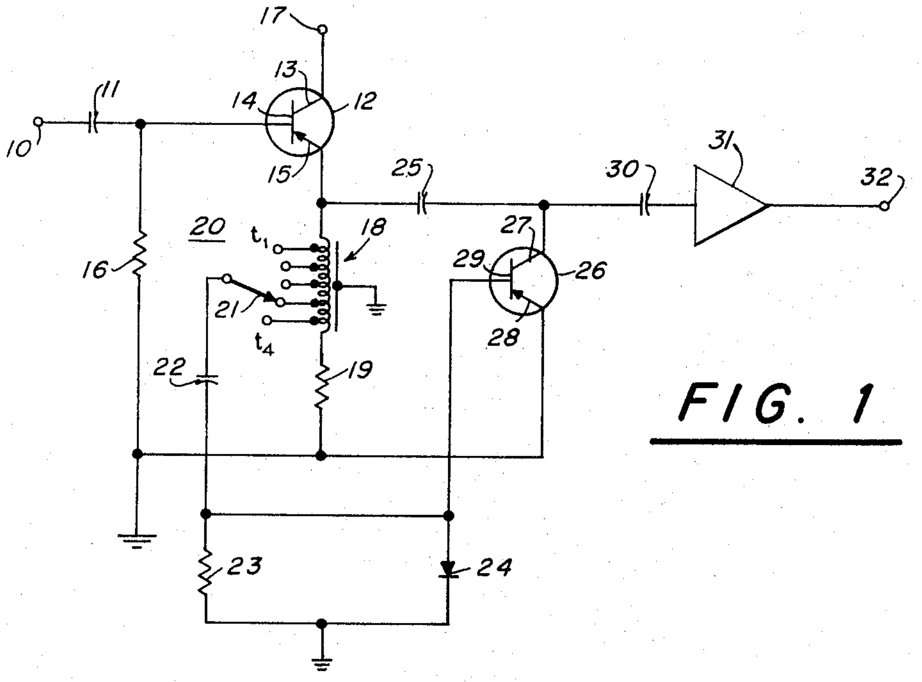
Figure 2:
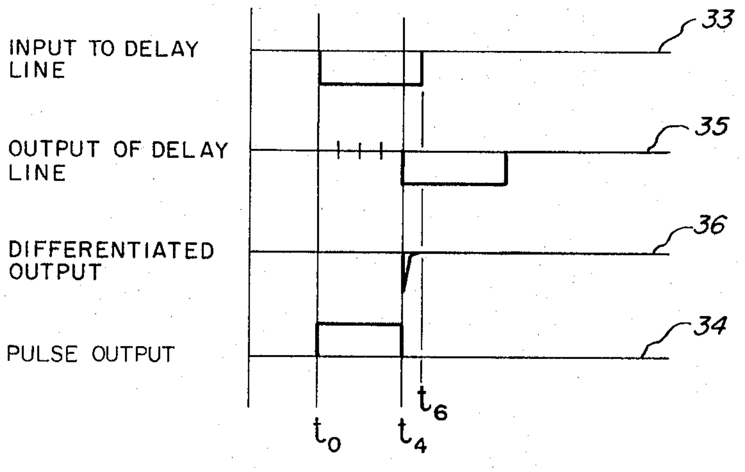

FIG. 1 is a simplified schematic of a preferred embodiment of the present invention, and FIG. 2 is a timing diagram illustrating the various waveforms.

FIG. 1 illustrates a preferred embodiment of the invention wherein a pulse is coupled in an input 10 through input capacitor 11 to an emitter follower comprising a transistor 12. Transistor 12 has a collector element 13, base 14 and emitter 15. Base 14 is connected to ground through base resistor 16. Bias is applied to the collector from a negative supply coupled in at another input 17.

The emitter 15 is coupled to the input of a delay line 18 having a multiplicity of output taps $t_1$ through $t_5$. It is to be understood that any number of taps may be utilized dependent on the number of pulse widths that are desired. Also, a continuously variable delay means might be used. Delay line 18 is terminated to ground through its characteristic impedance 19. A switch 20 having a movable contact 21 engages taps $t_1$ through $t_5$ dependent on the operator's setting. Switch 20 is coupled to one side of a capacitor 22, the other side of which is coupled to ground through a resistor 23. Capacitor 22 and resistor 23 comprise a differentiating network. A diode 24 is provided which is connected in parallel with resistor

23 and which has its anode connected to the common connection of the resistor 23 and capacitor 22 and its cathode connected to ground. The diode functions to ground any positive signals present at base 29 of transistor 26.

The emitter 15 of transistor 12 is also coupled to one side of a storage capacitor 25, the other side of which is connected to the collector of a transistor 26. Transistor 26 has a collector 27, emitter 28 and base 29. The common connection of capacitor 25 and collector 27 is connected to one side of a coupling capacitor 30 the other side of which is connected to the input of an amplifier 31. The output of amplifier is connected out to output terminal 32. The base 29 of transistor 26 is coupled to the anode of diode 24 and the emitter 28 is coupled directly to ground. It should be understood that capacitor 30 and amplifier 31 are not essential to the present invention.

In operation, initially transistor 26 is in its "off" state since no voltage is present at any of its terminals. In such an "off" condition the transistor is essentially a very high resistance between its collector and emitter terminals. At such a time therefor, capacitor 25 and transistor 26 appear as a series RC network between emitter 15 of transistor 12 and ground. Because of the high value of the resistance and by proper choice of the value of capacitor 25, the time constant (RC) of the network is very high. If a negative pulse is then applied to input terminal 10 and consequently appears at the emitter 15 of the emitter-follower amplifier comprising transistor 12, the emitter 15 will drop to a negative level as shown on line 33 of FIG. 2. As the emitter 15 goes negative, collector 27 of transistor 26 will simultaneously assume a similar level, since in a series RC circuit an initial voltage applied appears across the resistive element. Output terminal 32 will therefore assume a positive level, because of the inverting amplifier, as shown on line 34 of FIG. 2.

At time $t_4$, the pulse being processed will appear at the output of the delay line as shown on line 35 of FIG. 2, assuming a delay time of $t_4$–$t_0$ has been chosen. The action of the differentiating network of capacitor 22 and resistor 23 causes a negative spike to appear at base 29 in response to a negative level delay line output the spike is shown on line 36 of FIG. 2. The negative spike saturates transistor 26 momentarily and turns it "on," causing it to assume its very low resistance condition. At such time collector 27 is essentially at ground potential and capacitor 25 has charged to substantially the level of the signal at emitter 15. The charging time is very short because of the small effective time constant when the series resistance path through transistor 26 is very low. When transistor 26 has turned "on," with collector 27 assuming ground potential, the output at terminal 32 returns to ground or zero, thus completing the production of a pulse. Charged capacitor 25 causes collector 27 to remain at ground while emitter 15 is still at its negative level. When finally the input pulse has ceased at time $t_6$, capacitor 25 discharges through the forward-biased PN junction between collector 27 and base 29 of PNP transistor 26 and diode 24 to ground, thus clearing the circuit for a repeat cycle.

The technique utilized in the present invention is extremely advantageous in that not only is a pulse wider than delay line 18 capable of producing an output but a pulse shorter than the delay line may also be utilized. This is so in that only the leading edge of the pulse is needed to trigger the transistor 26, i.e., as soon as the leading edge produces the spike and transistor will be turned on and the capacitor 25 charged.

A further advantage of the circuit resides in the fact that the components are standard and the circuit is easily maintained in operation. Additionally, the spacing between input pulses is only limited by the width of output pulse. Further, the output pulse which is attained at output 32 has the desired shape, i.e., nearly square rather than a spike. In addition, as noted before, the system operates such that short pulses are not lost and therefore the output at 32 is relatively reliable and accurate.

Obviously many modifications and variations of the present invention are possible in the light of the above teachings. It is therefore to be understood that within the scope of the appended claims the invention may be practiced otherwise than as specifically described.

What is claimed is:

1. A pulse shaping circuit adapted to receive an input pulse of variable duration and produce a constant width output pulse in response thereto comprising, an input terminal for receiving said input pulse, delay means having an input and at least one output and adapted to produce signals at its output commensurate with signals at its input delayed in time by some fixed period, a transistor having a collector, an emitter and a base, a capacitor connected between said delay means input and said collector, means for supplying signals at said input terminal to said delay means input, differentiating means connected to said delay means output and arranged to produce differentiated output signals commensurate with any signals at said delay means output, said base of said transistor being connected to receive said differentiated output signals from said differentiating means, said emitter being connected to ground, an output terminal, means for supplying signals at said collector to said output terminal, whereby pulses are produced at said output terminal which have widths substantially equal to said delay period of said delay means in response to receipt of a pulse at said input.

2. The circuit of claim 1 wherein said delay means is adjustable to provide various preselected delay periods.

3. The circuit of claim 2 wherein said adjustable delay means comprises:

a delay line having a plurality of taps, means for selecting any one of said taps, whereby said delay line will have an output commensurate with the particular tap chosen.

4. The circuit of claim 1 wherein said means for supplying signals at said input terminal to said delay means input comprises:

a transistor amplifier arranged in an emitter-follower configuration.

5. The circuit of claim 1 further including:

a diode connected between said base of said transistor and ground and arranged to shunt signals from said differentiating means of undesired polarity to ground.

6. The circuit of claim 5 wherein said input pulses have negative magnitude:

said transistor being of the PNP type, said diode having its anode connected to said base and its cathode to ground.

References Cited by the Examiner

UNITED STATES PATENTS

| | | | |
|---|---|---|---|
| 2,572,080 | 10/1951 | Wallace | 328—58 |
| 2,866,091 | 12/1958 | Ault | 307—88.5 |
| 3,231,765 | 1/1966 | Martin et al. | 307—88.5 |

ARTHUR GAUSS, *Primary Examiner.*

B. P. DAVIS, *Assistant Examiner.*